United States Patent
Khalili

(10) Patent No.: US 8,391,349 B1
(45) Date of Patent: Mar. 5, 2013

(54) EQUALIZER WITH AUTOMATIC GAIN CONTROL (AGC)

(75) Inventor: Alireza Khalili, Sunnyvale, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 675 days.

(21) Appl. No.: 12/617,610

(22) Filed: Nov. 12, 2009

(51) Int. Cl.
*H03H 7/30* (2006.01)
(52) U.S. Cl. ........ 375/232; 375/345; 375/261; 330/279; 330/129; 330/133; 329/304; 329/306
(58) Field of Classification Search ............... 375/232, 375/345
See application file for complete search history.

(56) References Cited

U.S. PATENT DOCUMENTS

| 6,121,828 A * | 9/2000 | Sasaki .......................... 329/304 |
| 7,319,363 B2 * | 1/2008 | Langenbach et al. ......... 330/279 |
| 2006/0045217 A1 * | 3/2006 | Moughabghab et al. ..... 375/345 |

* cited by examiner

*Primary Examiner* — Eva Puente

(57) ABSTRACT

A combination equalizer and automatic gain control (AGC) is provided for high-speed receivers. The combination circuit comprises a first AGC having an input to accept a communication signal and an input to accept a first control signal. The first AGC modifies the communication signal gain in response to the first control signal, to supply a first stage signal at an output. An equalizer has an input to accept the first stage signal and an input to accept a second control signal. The equalizer modifies the frequency characteristics of the first stage signal in response to the second control signal, to supply an equalized signal at an output. A second AGC has an input to accept the equalized signal and an input to accept a third control signal. The second AGC modifies the equalized signal gain in response to the third control signal, to supply a second stage signal at an output.

13 Claims, 8 Drawing Sheets

US 8,391,349 B1

EQUALIZER WITH AUTOMATIC GAIN CONTROL (AGC)

BACKGROUND OF THE INVENTION

1. Field of the Invention

This invention generally relates to electronic communication receiver circuitry and, more particularly to a low-power two-stage automatic gain control (AGC) that incorporates a frequency equalization function.

2. Description of the Related Art

Two primary components of a modern communications receiver front end are an AGC and an equalizer. Since the input signal strength is both unknown and subject to change, an AGC is required to amplify the input signal to a predetermined constant signal level for subsequent processing. An equalizer is typically required to compensate for signal bandpass degradation that may occur in the transmission channel.

FIG. 1 is a schematic block diagram of an exemplary equalizer (prior art). A received signal can be multiplexed through either a high pass or low pass signal path to compensate for signal bandpass degradation.

Generally, AGC is an adaptive system where the average output signal level is fed back to adjust the gain to a predetermined power, for a relatively large dynamic range of input signal levels.

High speed receiver front ends impose strict constraints on the quality of the analog front ends. Power, noise, bandwidth, and signal integrity all have to be optimized at the same time. To this end, a high-performance front stage is a critical component to these systems. Conventional front ends are relatively power hungry in performance of these goals.

It would be advantageous if a combination AGC/equalizer circuit existed that provided a high level of performance, while minimizing power consumption.

SUMMARY OF THE INVENTION

Disclosed herein is a combination circuit that performs automatic gain control (AGC) and equalizer functions. Two cascaded AGC stages with separate controls are used to give additional degrees of freedom for controlling power, linearity and gain range. A separate amplitude monitor (e.g., a peak detector) at the output of the first stage generates a separate control for the first AGC stage to keep the output of the first stage within a certain range around the ideal AGC output level and reduce the input signal range. This control helps accommodate the maximum dynamic range in this stage, since its gain can be increased for smaller input signal levels (detected based on the foregoing peak-detector monitor). Linearity is poorer for large input signals, but the gain can be lowered to keep non-linearities small. This stage contributes most to the AGC range, while maintaining a minimal non-linearity penalty.

The second stage is controlled by the second AGC peak-detector at its output. Since its input signal level is limited to a small range close to the ideal level, linearity is less signal-dependent, and a separate control loop independently tunes the gain to achieve optimal performance in this stage, with little non-linearity penalty. The equalizer function is realized, by putting a varactor at the output of the first stage AGC, with almost no power penalty.

Accordingly, a combination equalizer and AGC is provided for high-speed receivers. The combination circuit comprises a first AGC having an input to accept a communication signal and an input to accept a first control signal. The first AGC modifies the communication signal gain in response to the first control signal, to supply a first stage signal at an output. An equalizer has an input to accept the first stage signal and an input to accept a second control signal. The equalizer modifies the frequency characteristics of the first stage signal in response to the second control signal, to supply an equalized signal at an output. A second AGC has an input to accept the equalized signal and an input to accept a third control signal. The second AGC modifies the equalized signal gain in response to the third control signal, to supply a second stage signal at an output.

In one aspect, the first AGC input accepts a differential communication signal and the output supplies a differential first stage signal including a reference signal and an inverted signal. In this aspect the equalizer is a varactor having an anode connected to the first stage reference signal and a cathode connected to the first stage inverted signal. The second AGC input accepts a differential equalized signal, which is the first stage reference and inverted signals, as modified by the varactor, and the second AGC output supplies a differential second stage signal.

Additional details of the above-described combination equalizer/AGC, an equalizer circuit, and a method for controlling the gain and frequency response of an input communication signal in a high-speed receiver, are provided below.

DETAILED DESCRIPTION

Figure 2:
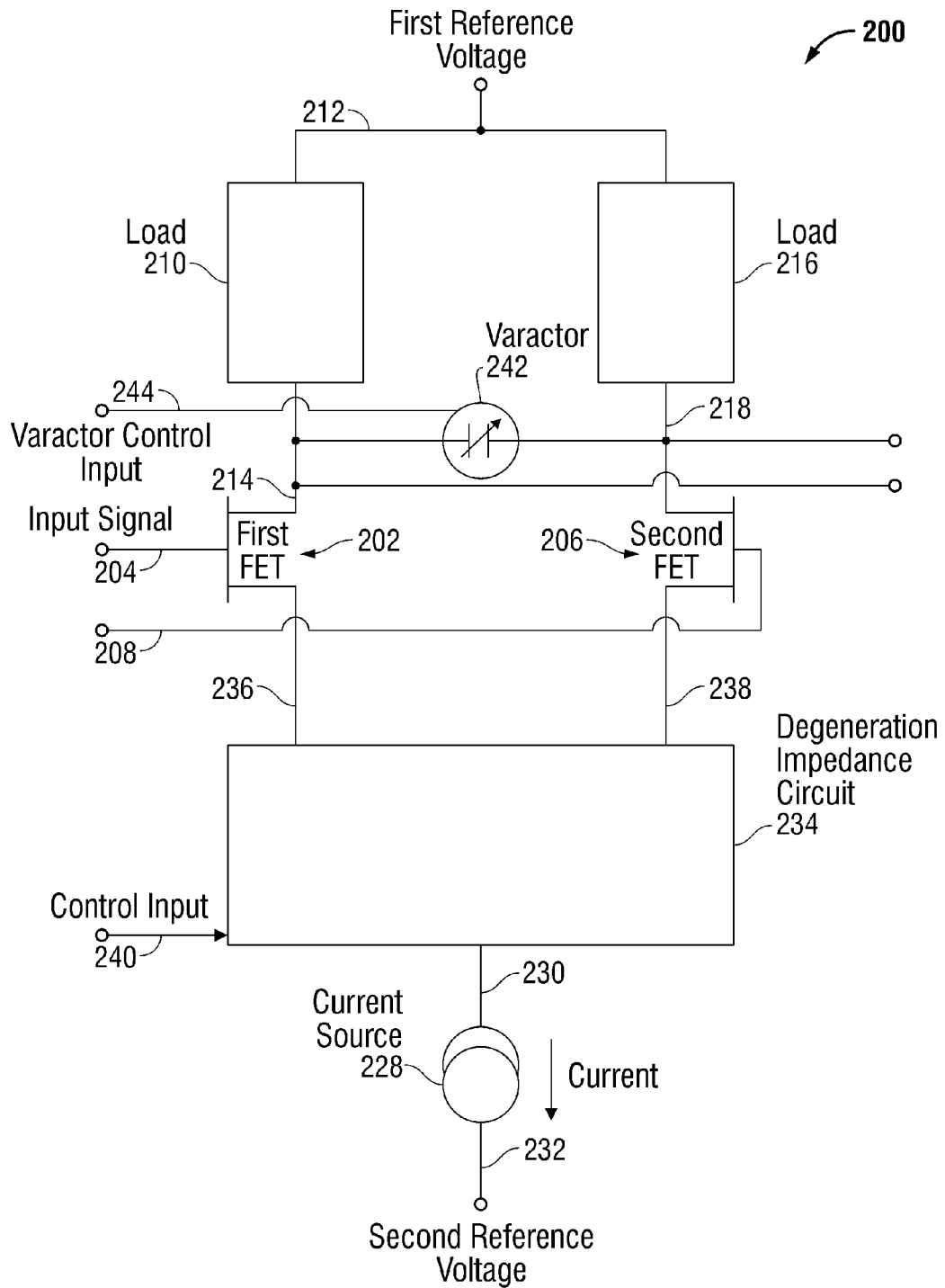
FIG. 2 is a schematic drawing of a high-speed receiver equalizer.

FIG. 2 is a schematic drawing of a high-speed receiver equalizer. The equalizer 200 comprises a pair of field effect transistors (FETs) including a first FET 202 having a gate to accept an input signal on line 204 and a second FET 206 having a gate to accept a differential input signal on line 208, which is the inverse of the input signal on line 204. FETs 202 and 206 may also be referred to as a differential amplifier. A first load 210 has a first interface connected to a first reference voltage on line 212 and a second interface connected to a drain of the first FET on line 214. A second load 216 has a first interface connected to the first reference voltage on line 212 and a second interface connected to a drain of the second FET on line 218.

A current source 228 has a first interface on line 230 connected to accept current from the source of the first FET 202 and the source of the second FET 206. The current source 228 has a second interface connected to a second reference voltage on line 232. The second reference voltage typically has a voltage potential less than the first reference voltage. There are many types of current source designs known by those with skill in the art, and the equalizer 200 of FIG. 2 is not limited to any particular current source design.

A degeneration impedance circuit 234 has a first interface connected to the source of the first FET on line 236, a second interface connected to the source of the second FET on line 238, a third interface connected to the current source on line 230, and a control input on line 240. The degeneration impedance circuit 234 varies the impedance between the degeneration impedance circuit first interface on line 236 and degeneration impedance circuit second interface on line 238 in response to a degeneration control signal accepted at the degeneration impedance circuit control input on line 240.

A varactor 242 has a first end connected to the drain of the first FET on line 214, a second end connected to the drain of the second FET on line 218, and a control input on line 244. The varactor 242 varies capacitance between the first and second varactor interfaces in response to a varactor control signal accepted at the varactor control input on line 244.

Figure 3:
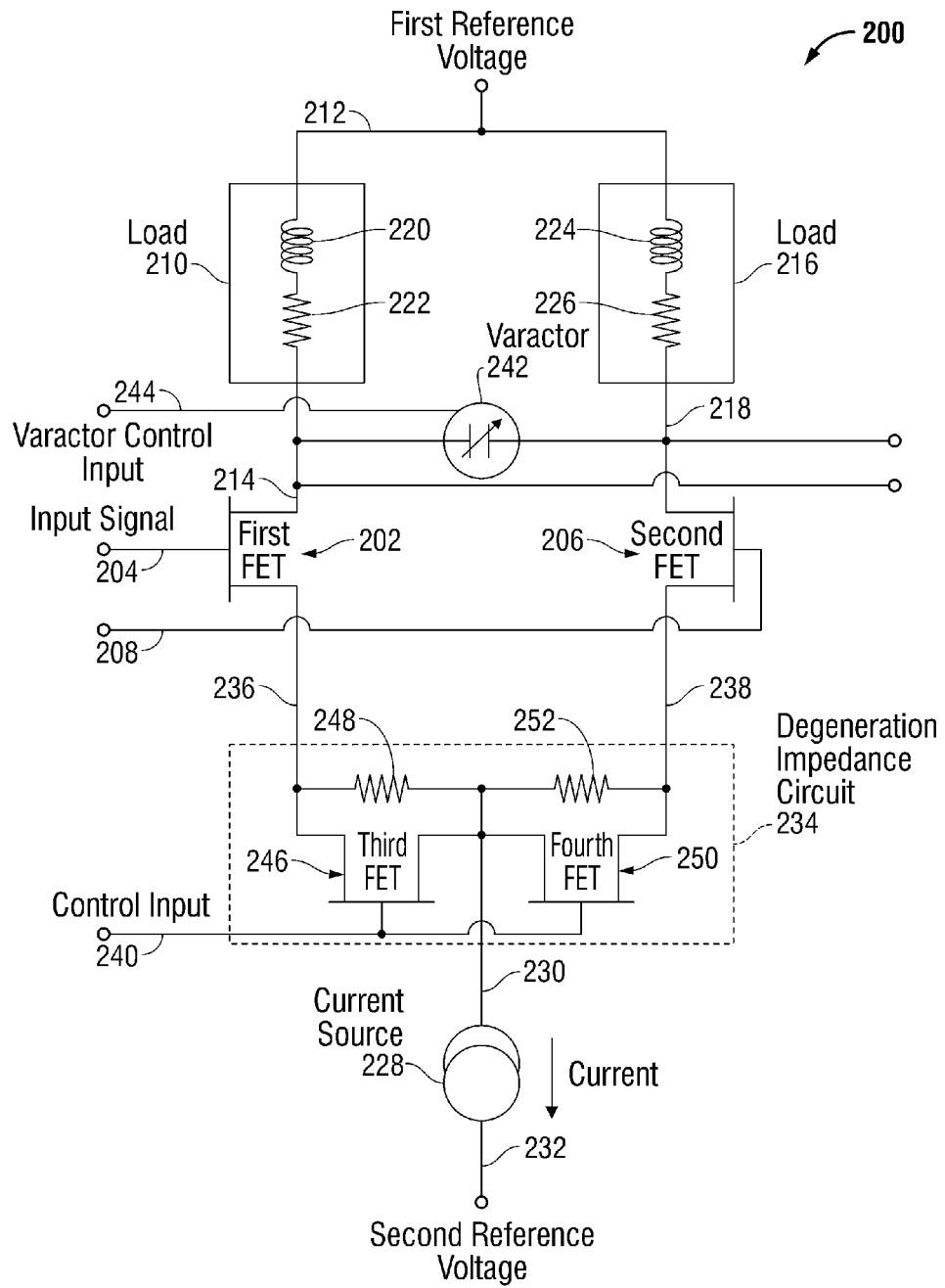
FIG. 3 is a schematic drawing depicting exemplary variations to the equalizer of FIG. 2.

FIG. 3 is a schematic drawing depicting exemplary variations to the equalizer of FIG. 2. In one aspect as shown, the first load 218 includes an inductor 220 in series with a resistor 222. Likewise, the second load 216 includes an inductor 224 in series with a resistor 226.

In one aspect as shown, the degeneration impedance circuit 234 includes a third FET 246 with a first S/D connected to the source of the first FET on line 236, a second S/D connected to the current source first interface on line 230, and a gate to accept the degeneration control signal on line 240. A first resistor 248 has a first end connected to the third FET first S/D on line 236 and a second end connected to the current source first interface on line 230. A fourth FET 250 has a first S/D connected to the source of the second FET on line 238, a second S/D connected to the current source first interface on line 230, and a gate to accept the degeneration control signal on line 240. A second resistor 252 has a first end connected to the fourth FET first S/D on line 238 and a second end connected to the current source first interface on line 230.

Figure 4:
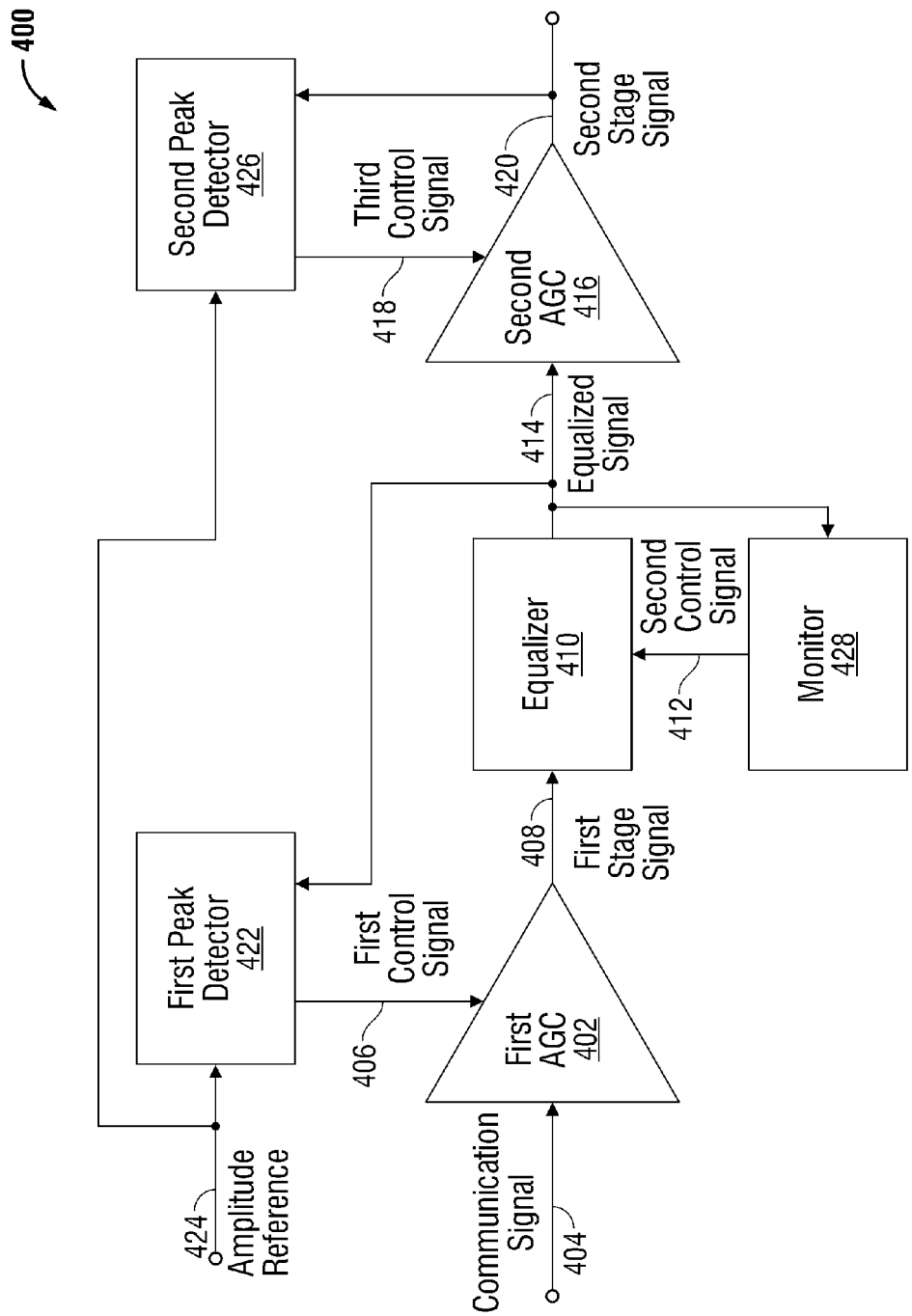
FIG. 4 is a schematic block diagram of a combination equalizer and automatic gain control circuit (AGC) for high-speed receivers.

FIG. 4 is a schematic block diagram of a combination equalizer and automatic gain control circuit (AGC) for high-speed receivers. The combination circuit 400 comprises a first AGC 402 having an input on line 404 to accept a communication signal and an input on line 406 to accept a first control signal. The first AGC 402 modifies the communication signal gain in response to the first control signal on line 406, to supply a first stage signal at an output on line 408.

An equalizer 410 has an input on line 408 to accept the first stage signal and an input on line 412 to accept a second control signal. The equalizer 410 modifies the frequency characteristics of the first stage signal in response to the second control signal on line 412, to supply an equalized signal at an output on line 414. A second AGC 416 has an input on line 414 to accept the equalized signal and an input on line 418 to accept a third control signal. The second AGC 416 modifies the equalized signal gain in response to the third control signal on line 418, to supply a second stage signal at an output on line 420.

A first peak-detector 422 has an input on line 414 to accept the equalized signal. The first peak detector 422 compares the equalized signal amplitude to a predetermined amplitude reference on line 424 and supplies the first control signal at an output on line 406 in response to the comparison. A second peak-detector 426 has an input on line 420 to accept the second stage signal. The second peak detector 426 compares the second stage amplitude to the predetermined amplitude reference on line 424 and supplies the second control signal at an output on line 418 in response to the comparison. Note: a single amplitude reference is shown being supplied to both the first peak detector 422 and the second peak detector 426. Alternately but not shown, separate amplitude references may be used for the peak detectors. A monitor 428 accepts the equalized signal on line 414 and supplies the second control signal on line 412. In one aspect, the monitor is an application of software instructions executed by a processor. Alternately but not shown, the monitor 428 may accept an analog signal generated from an analysis of the bandwidth at the end of the analog front-end circuitry.

In one aspect, the equalizer 410 supplies an equalized signal on line 414 having an amplitude within ±x % of a predetermined amplitude, and the second AGC 416 supplies a second stage signal on line 420 having the predetermined amplitude. For example, the equalizer 410 may supply an equalized signal having an amplitude within ±50% of the predetermined amplitude.

In one aspect the first AGC of FIG. 4 can be enabled with the differential amplifier pair 202/206 and degeneration impedance circuit 234 of FIG. 2. Further, the equalizer of FIG. 4 can be enabled using the varactor 242 of FIG. 2. Thus, the first AGC input accepts a differential communication signal on lines 204/208 and the output supplies a differential first stage signal including a reference signal on line 214 and an inverted signal on line 218. The varactor 242 has an anode connected to the first stage reference signal on line 214 and a cathode connected to the first stage inverted signal on line 218. Additional details of the first AGC can be found in the explanation of FIGS. 2 and 3, and are not repeated here in the interests of brevity.

Figure 5:
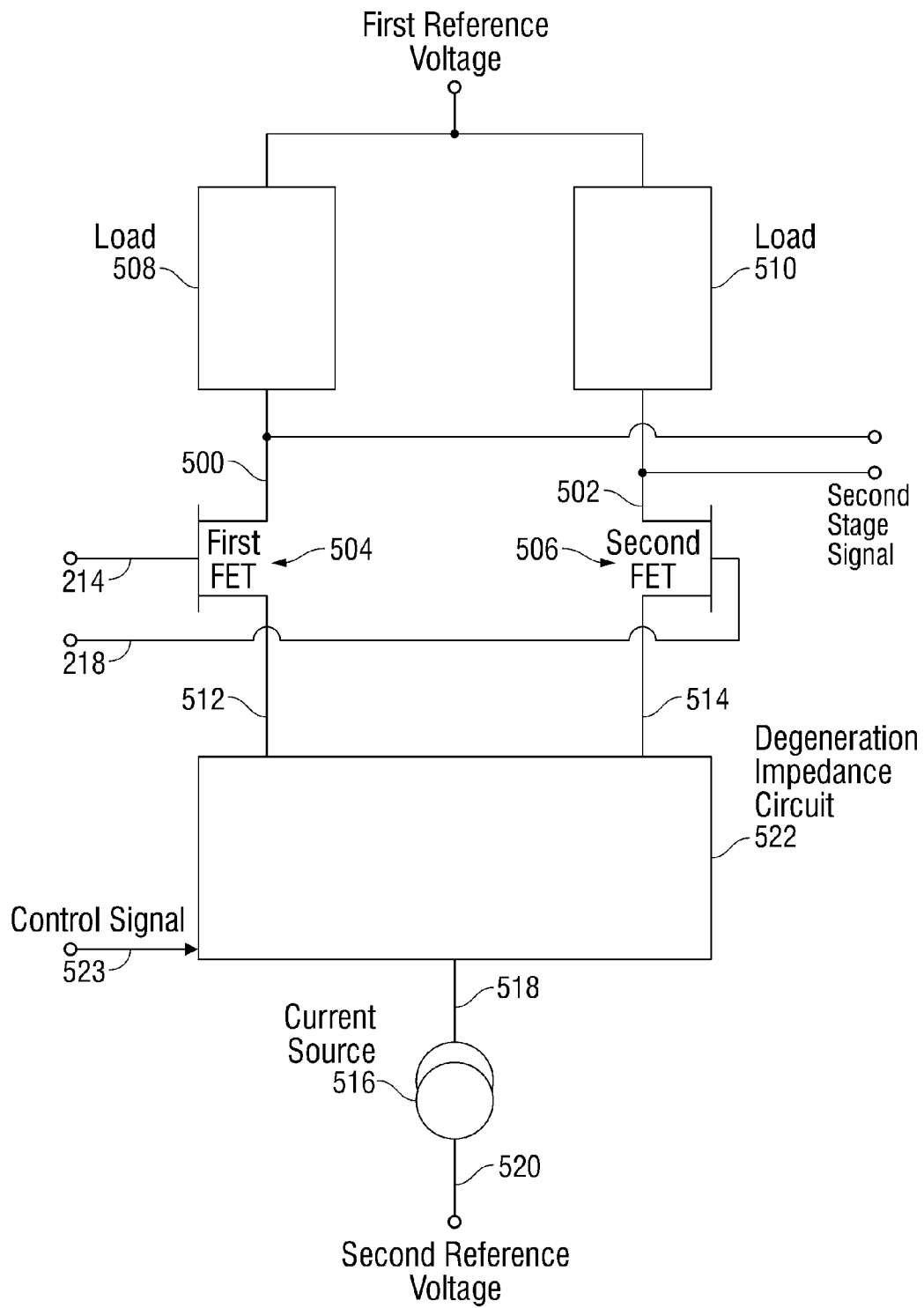
FIG. 5 is a schematic diagram depicting a more detailed example of the second AGC of FIG. 4.

FIG. 5 is a schematic diagram depicting a more detailed example of the second AGC of FIG. 4. The second AGC input accepts a differential equalized signal, which is the first stage reference on line 214 (see FIG. 3) and the inverted signal on line 218, as modified by the varactor. The second AGC output supplies a differential second stage signal on line 500 and 502. The second AGC includes a differential amplifier, comprising a first FET 504 and a second FET 506, connected to the first reference voltage via loads 508 and 510, respectively, and having first and second current interfaces on lines 512 and 514, respectively. The differential amplifier 504/506 accepts the differential equalized signal on lines 214 and 218 and supplies the differential second stage signal on lines 500 and 502.

A current source 516 has a first interface on line 518, and a second interface connected to the second reference voltage on line 520. A degeneration impedance circuit 522 is interposed between the differential amplifier first current interface on line 512 and second current interface on line 514. The degeneration impedance circuit 522 has an input on line 523 to accept a control signal (i.e. the third control signal of FIG. 4).

Figure 6:
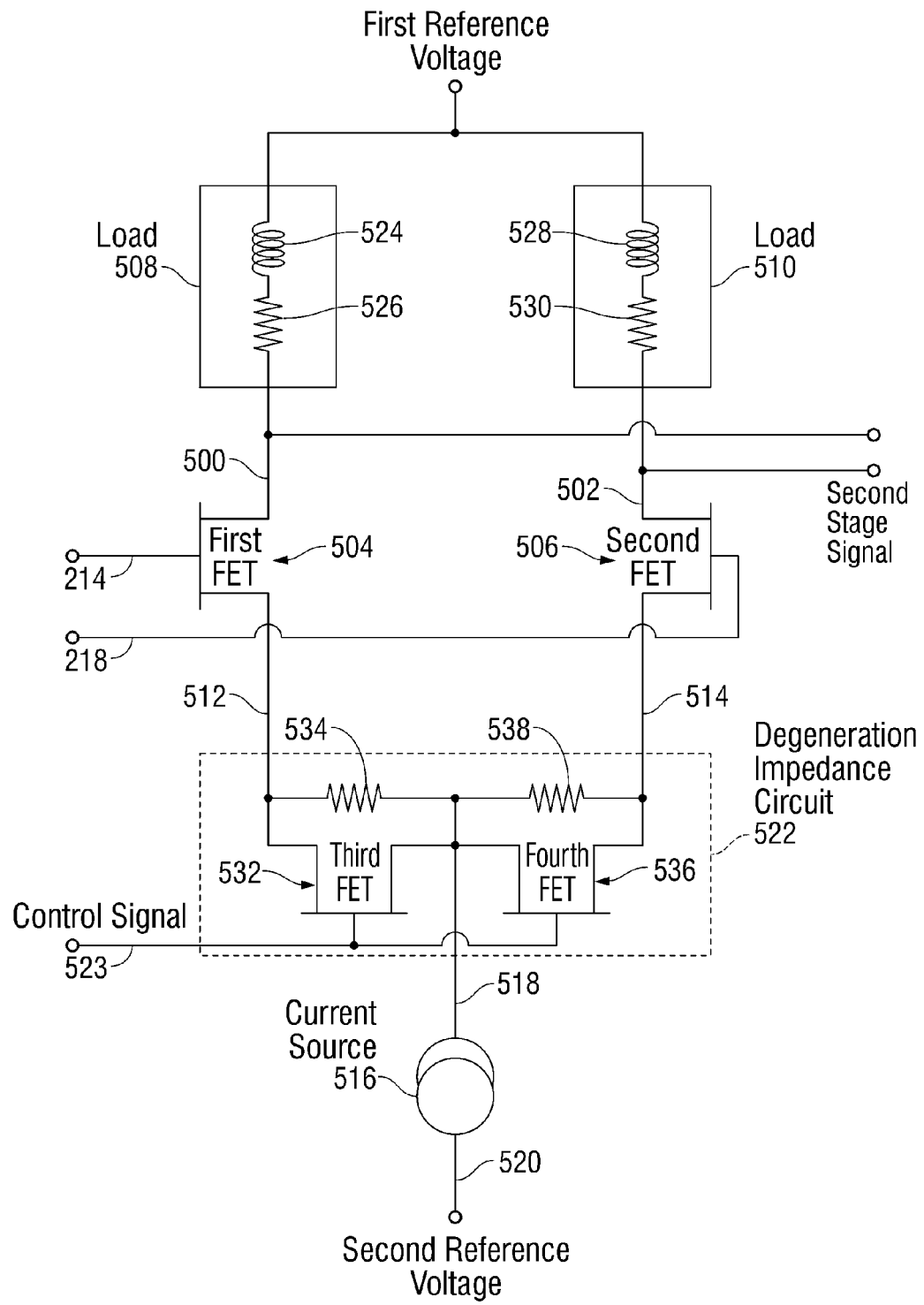
FIG. 6 is a schematic diagram depicted a detailed example of the second AGC of FIG. 5.

FIG. 6 is a schematic diagram depicted a detailed example of the second AGC of FIG. 5. The load 508 may be comprised of inductor 524 and a first resistor 526. Load 510 may be comprised of inductor 528 and a second resistor 530. In this aspect, the degeneration impedance circuit 522 includes a third FET 532 with a first S/D connected to the differential amplifier first current interface on line 512, a second S/D connected to the current source first interface on line 518, and a gate to accept the control signal on line 523. A third resistor 534 has a first end connected to the third FET first S/D on line 512 and a second end connected to the current source first interface on line 518. A fourth FET 536 has a first S/D connected to the differential amplifier second current interface on line 514, a second S/D connected to the current source first interface on line 518, and a gate to accept the control signal on line 523. A fourth resistor 538 has a first end connected to the fourth FET first S/D on line 514 and a second end connected to the current source first interface on line 518.

Figure 7:
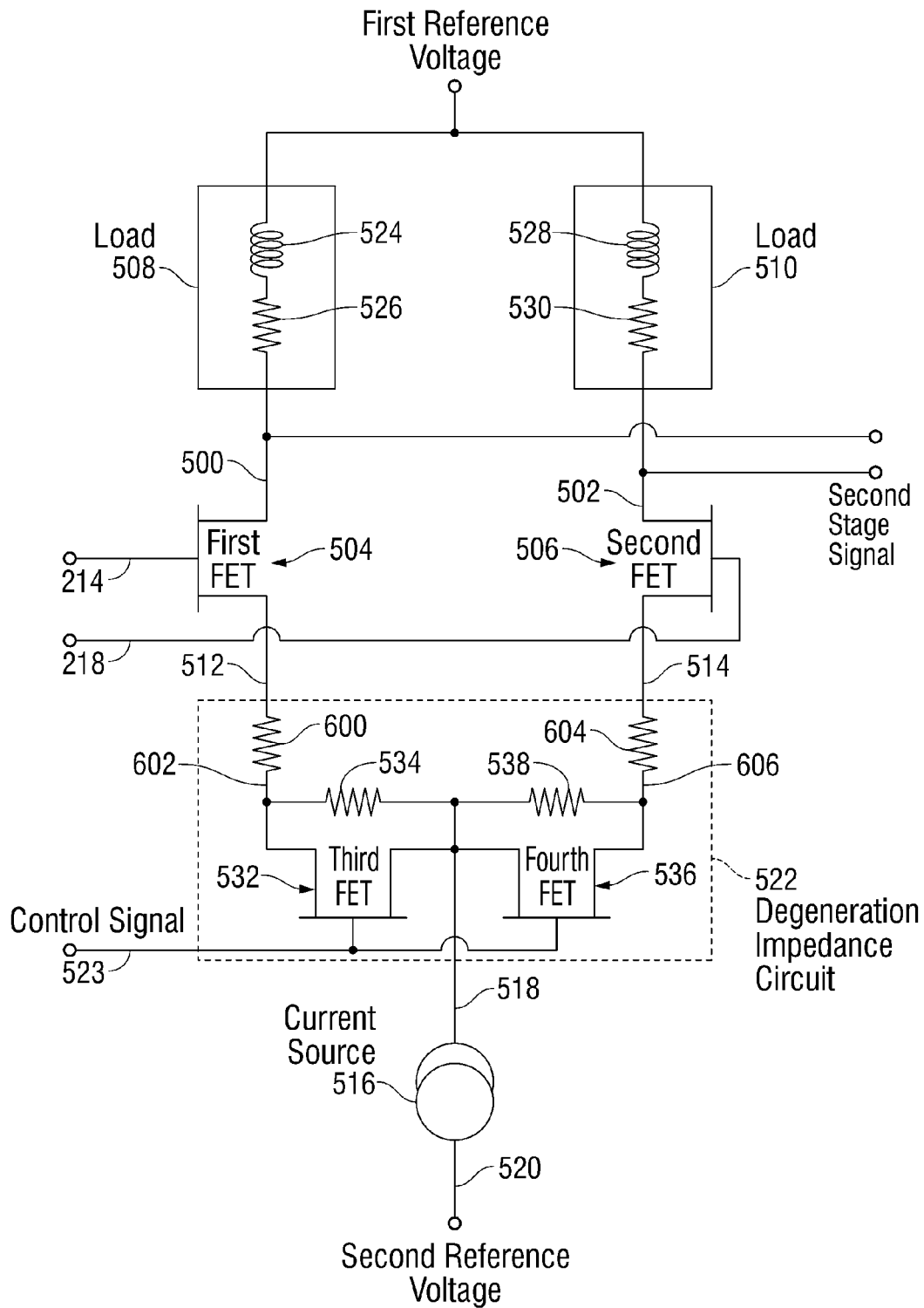
FIG. 7 is a schematic diagram depicting a variation in the degeneration impedance circuit of FIG. 6.

FIG. 7 is a schematic diagram depicting a variation in the degeneration impedance circuit of FIG. 6. In the aspect, the degeneration impedance circuit 522 further includes a fifth resistor 600 interposed between the differential amplifier first current interface on line 512 and the third FET first S/D on line 602. A sixth resistor 604 is interposed between the differential amplifier second current interface on line 514 and the fourth FET first S/D on line 606.

FUNCTIONAL DESCRIPTION

Figure 8:
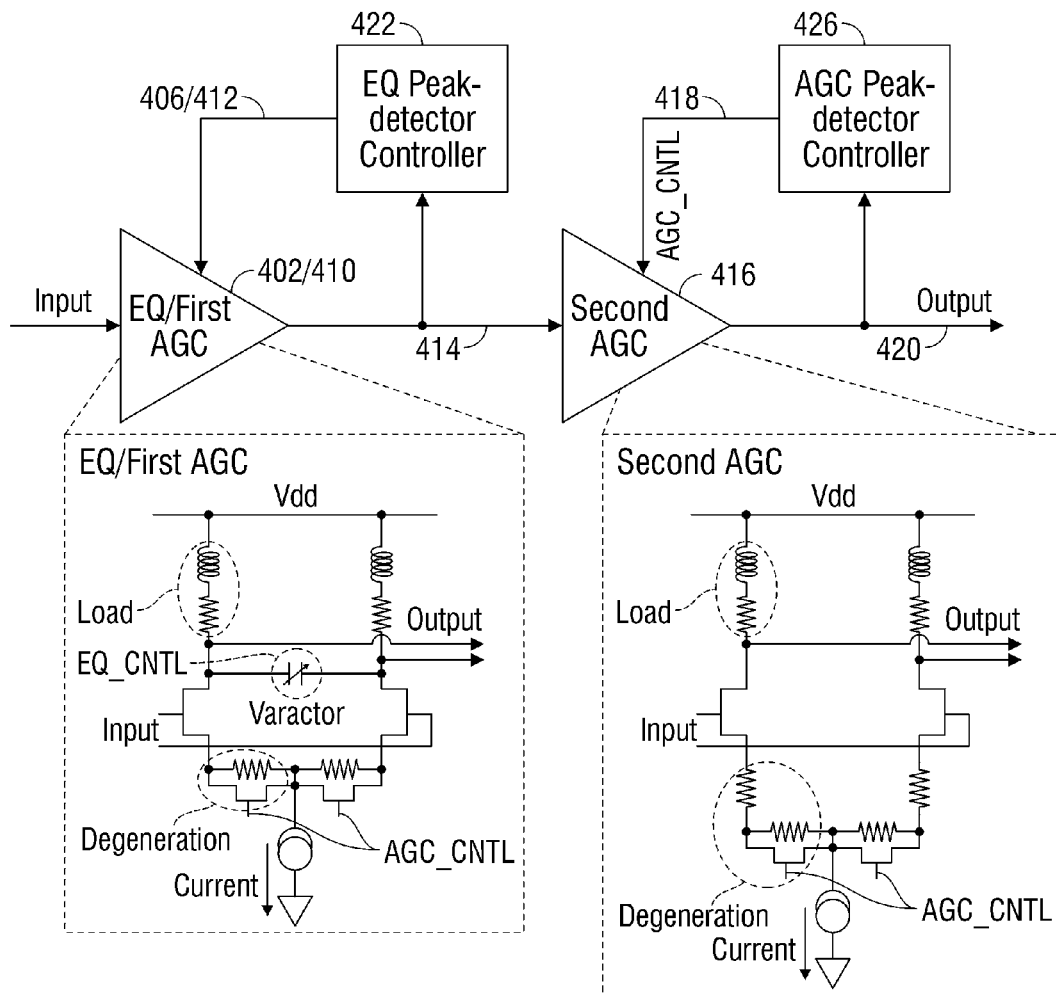
FIG. 8 is a combination block diagram and schematic depicting features of the circuits illustrated in FIGS. 3, 4, and 7.

FIG. 8 is a combination block diagram and schematic depicting features of the circuits illustrated in FIGS. 3, 4, and 7. The first AGC and the equalizer 402/410 take a wide-band high-dynamic-range off-chip signal (input) and adjust the gain, according to the input amplitude, to lower the input range by >60%. This is done through the depicted feedback system 422, which senses the peak-value of the output of the equalizer/AGC circuit and feeds this value to digital logic, which calculates the optimal value for the control signals (first AGC/EQ_CNTL) that go back to the first AGC/EQ block 402/410. One possible way to use this signal to change the gain of the stage is to use a degeneration resistor, which is a parallel combination of a MOS transistor (FET) and a fixed resistor. The MOS transistor is adjusted through control of the voltage on the gate of the MOS transistor. Here the gain of the stage is traded directly with linearity through the degeneration resistance, to achieve optimal gain control. This stage also serves as a low-speed filtering stage through a RLC shunt-peaked load that can be tuned by a varactor. Being the dominant slow-stage of the system, this stage can dictate the bandwidth of the entire circuit. The control voltage for the varactor is also supplied by a digital controller and is shown here as part of the first AGC/EQ_CNTL bus on line 406/412. The load resistor can also be programmed to match an off-chip ideal resistor for better control of the bandwidth.

The second stage (AGC) serves as another gain-control stage. Due to the lowered range at its input, this stage is able to meet tougher linearity specifications. This is made possible by reducing the gain control range thru addition of a fixed degeneration resistor, thus improving its linearity. Similar to the first AGC/EQ stage, the gain is adjusted through feedback from the second peak detector 426 by the AGC_CNTL signal on line 418. Finally, the output of this stage can be programmed or set to a constant envelope signal suitable for further stages on the chip.

Due to limited number of stages, the power consumption is kept at very small levels. Moreover, the novel implementation of the equalizer in the first stage limits out-of-band noise injection from off-chip sources with no analog power overhead.

This partitioning of the AGC operation into two blocks, the first AGC/EQ and second AGC, with two different peak detectors has the following benefits. Linearity can be traded to attain a larger gain range in the first stage, responsive to a large input range. The second stage linearity is improved, at the price of a reduced gain range, by adding a fixed degeneration resistor in series between the differential amplifiers and current source.

The equalizer function is realized by putting a varactor at the output of the first stage AGC, with almost no power penalty. The varactor control can be generated initially during the chip bring-up by measuring the frequency filtering property of the AGC on a test input signal. Two cascaded AGC stages with separate controls are used here to give additional degrees of freedom for controlling power, linearity and gain range. A separate amplitude monitor (peak detector) at the output of the first stage generates a separate control for the first AGC stage to keep the output of the first stage within a certain range around the ideal AGC output level and reduce the input signal range. This helps accommodate maximum dynamic range in this stage, since its gain can be increased for smaller input signal levels (detected based on the foregoing peak-detector monitor), without much of a non-linearity penalty. Linearity is poorer for large input signals, but the gain can be lowered to keep non-linearities small. This stage contributes most to the AGC range, while maintaining a minimal non-linearity penalty.

In contrast, the second AGC stage trades gain for linearity. The second stage is controlled by the second AGC peak-detector at its output. Since its input signal level is now limited to a small range close to the ideal level, linearity is less signal-dependent. A separate control loop independently tunes the gain to achieve optimal performance in this stage, with little non-linearity penalty.

Figure 1:
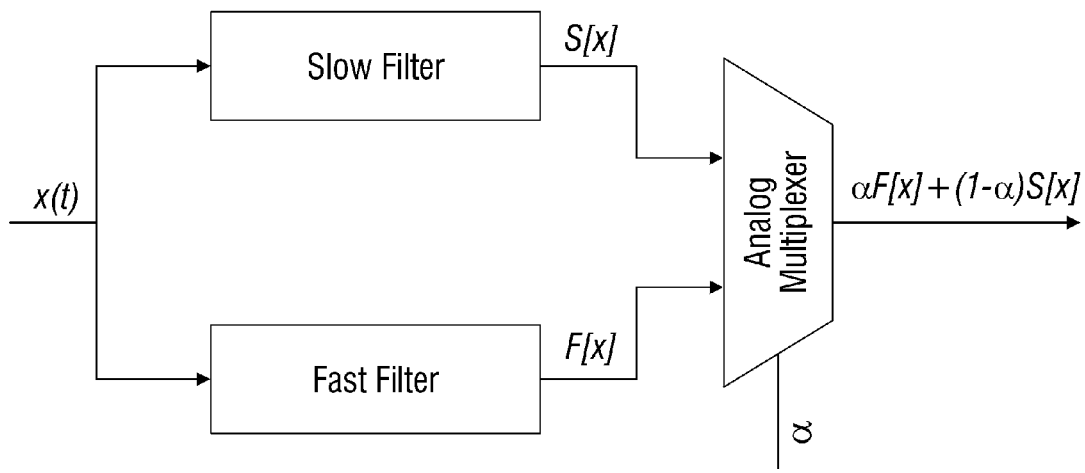
FIG. 1 is a schematic block diagram of an exemplary equalizer (prior art).
Figure 9:
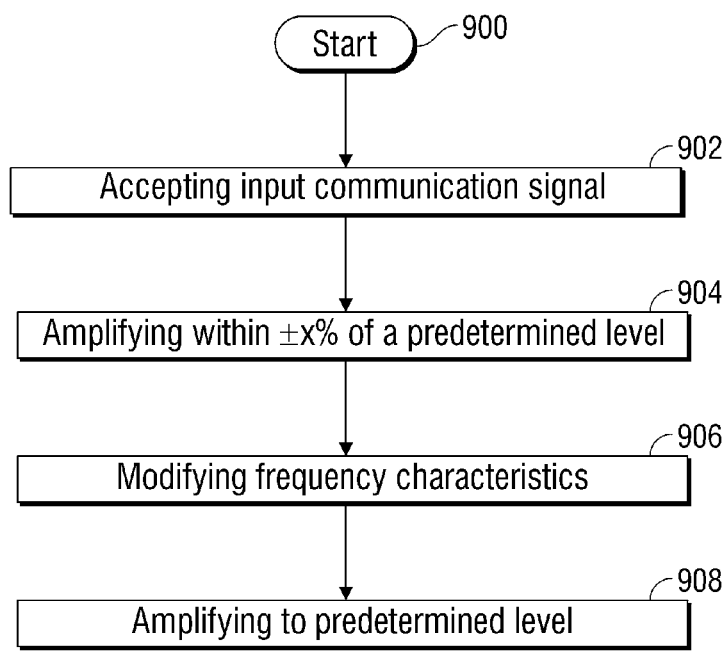
FIG. 9 is a flowchart illustrating a method for controlling the gain and frequency response of an input communication signal in a high-speed receiver.

FIG. 9 is a flowchart illustrating a method for controlling the gain and frequency response of an input communication signal in a high-speed receiver. Although the method is depicted as a sequence of numbered steps for clarity, the numbering does not necessarily dictate the order of the steps. It should be understood that some of these steps may potentially be skipped, performed in parallel, or performed without the requirement of maintaining a strict order of sequence. The method starts at Step 900.

Step 902 accepts an input communication signal. Step 904 amplifies the communication signal, creating to a first stage signal having an amplitude within ±x % of a predetermined amplitude. In one aspect, x=50. Step 906 modifies the frequency characteristics of the first stage signal, creating an equalized signal. Step 908 amplifies the equalized signal, creating a second stage signal having the predetermined amplitude.

In one aspect, amplifying the communication signal and equalized signal in Steps 904 and 908, respectively, includes consuming dc power to amplify the signals. However, modifying the frequency characteristics of the first stage signal in Step 906 includes modifying the frequency characteristics without consuming any dc power (except for a small amount of leakage current). This power saving is a result of using a varactor to perform the frequency equalization function.

A combination AGC and equalizer circuit has been provided, along with an associated gain and frequency control method. Explicit circuit details have been given as examples to illustrate the invention. However, the invention is not limited to merely these examples. Other variations and embodiments of the invention will occur to those skilled in the art.

I claim:

1. A combination equalizer and automatic gain control circuit (AGC) for high-speed receivers, the combination circuit comprising:

a first AGC having an input to accept a communication signal and an input to accept a first control signal, the first AGC modifying the communication signal gain in response to the first control signal, to supply a first stage signal at an output;

an equalizer having an input to accept the first stage signal and an input to accept a second control signal, the equalizer modifying frequency characteristics of the first stage signal in response to the second control signal, to supply an equalized signal at an output;

a first peak-detector operable to supply the first control signal by comparing the equalized signal amplitude to a predetermined amplitude reference;

a second AGC having an input to accept the equalized signal and an input to accept a third control signal, the second AGC modifying the equalized signal gain in response to the third control signal, to supply a second stage signal at an output; and a second peak-detector operable to supply the third control signal by comparing the second stage amplitude to the predetermined amplitude reference.

2. The combination circuit of claim 1 wherein the first AGC input accepts a differential communication signal and the output supplies a differential first stage signal including a reference signal and an inverted signal;

wherein the equalizer is a varactor having an anode connected to the first stage reference signal and a cathode connected to the first stage inverted signal; and, wherein the second AGC input accepts a differential equalized signal, which is the first stage reference and inverted signals, as modified by the varactor, and the second AGC output supplies a differential second stage signal.

3. The combination circuit of claim 1 wherein the equalizer supplies the equalized signal having an amplitude within a selected percentage of a predetermined amplitude; and, wherein the second AGC supplies a second stage signal having the predetermined amplitude.

4. The combination circuit of claim 1 wherein the equalizer supplies the equalized signal having an amplitude within ±50% of the predetermined amplitude.

5. The combination circuit of claim 2 wherein the first AGC includes a first differential amplifier connected to a first reference voltage and having first and second current interfaces, the first differential amplifier accepting the differential communication signal and supplying the differential first stage signal;

a first current source with a first interface, and a second interface connected to a second reference voltage;

a first degeneration impedance circuit interposed between the first differential amplifier first and second current interfaces, the first degeneration impedance circuit including:
a first field-effect transistor (FET) with a first source/drain (S/D) connected to the first differential amplifier first current interface, a second S/D connected to the first current source first interface, and a gate to accept the first control signal;
a first resistor having a first end connected to the first FET first S/D and a second end connected to the first current source first interface;
a second FET with a first S/D connected to the first differential amplifier second current interface, a second S/D connected to the first current source first interface, and a gate to accept the first control signal; and,
a second resistor having a first end connected to the second FET first S/D and a second end connected to the first current source first interface.

6. The combination circuit of claim 5 wherein the second AGC includes a second differential amplifier connected to the first reference voltage and having first and second current interfaces, the second differential amplifier accepting the differential equalized signal and supplying the differential second stage signal;

a second current source with a first interface, and a second interface connected to the second reference voltage;

a second degeneration impedance circuit interposed between the second differential amplifier first and second current interfaces, the second degeneration impedance circuit including:
a third FET with a first S/D connected to the second differential amplifier first current interface, a second S/D connected to the second current source first interface, and a gate to accept the second control signal;
a third resistor having a first end connected to the third FET first S/D and a second end connected to the second current source first interface;
a fourth FET with a first S/D connected to the second differential amplifier second current interface, a second S/D connected to the second current source first interface, and a gate to accept the second control signal; and,
a fourth resistor having a first end connected to the fourth FET first S/D and a second end connected to the second current source first interface.

7. The combination circuit of claim 6 wherein the second degeneration impedance circuit further includes:
a fifth resistor interposed between the second differential amplifier first current interface and the third FET first S/D; and,
a sixth resistor interposed between the second differential amplifier second current interface and the fourth FET first S/D.

8. A method for controlling gain and frequency response of an input communication signal in a high-speed receiver, the method comprising:

receiving the input communication signal;

amplifying the communication signal to create a first stage signal comprising an amplitude within a selected percentage of a selected amplitude as controlled by a first control signal;

modifying frequency characteristics of the first stage signal as controlled by a second control signal to create an equalized signal, wherein the amplification of the communication signal is controlled by a first peak-detector operable to supply the first control signal by comparing the equalized signal to a predetermined amplitude reference; and amplifying the equalized signal to create a second stage signal with the predetermined amplitude, wherein the modification of frequency characteristics of the first stage signal is controlled by a second peak-detector operable to supply a third control signal by comparing the second stage signal amplitude to the predetermined amplitude reference.

9. The method of claim 8 wherein amplifying the communication signal and equalized signal includes consuming dc power to amplify the communication signal and equalized signal; and, wherein modifying the frequency characteristics of the first stage signal includes modifying the frequency characteristics with low DC power consumption.

10. The method of claim 8 wherein creating the first stage signal includes creating the first stage signal having an amplitude within ±50% of the predetermined amplitude.

11. A high-speed receiver equalizer, the equalizer comprising:
a pair of field effect transistors (FETs) including a first FET having a gate to accept an input signal and a second FET having a gate to accept a differential input signal that is the inverse of the input signal;

a first load having a first interface connected to a first reference voltage and a second interface connected to a drain of the first FET;

a second load having a first interface connected to the first reference voltage and a second interface connected to a drain of the second FET;

a current source having a first interface connected to accept current from a source of the first FET and a source of the second FET, and a second interface connected to a second reference voltage, having a voltage potential less than the first reference voltage;

a degeneration impedance circuit having a first interface connected to the source of the first FET, a second interface connected to the source of the second FET, a third interface connected to the current source first interface, and a control input, the degeneration impedance circuit varying impedance between the degeneration impedance circuit first and second interfaces in response to a degeneration control signal accepted at the degeneration impedance circuit control input; and, a varactor having a first end connected to the drain of the first FET, a second end connected to the drain of the second FET, and a control input, the varactor varying capacitance between the first and second varactor interfaces in response to a varactor control signal accepted at the varactor control input.

12. The equalizer of claim 11 wherein the first and second loads each include an inductor in series with a resistor.

13. The equalizer of claim 11 wherein the degeneration impedance circuit includes:

a third field-effect transistor (FET) with a first source/drain (S/D) connected to the source of the first FET, a second S/D connected to the current source first interface, and a gate to accept the degeneration control signal;

a first resistor having a first end connected to the third FET first S/D and a second end connected to the current source first interface;

a fourth FET with a first S/D connected to the source of the second FET, a second S/D connected to the current source first interface, and a gate to accept the degeneration control signal; and, a second resistor having a first end connected to the fourth FET first S/D and a second end connected to the current source first interface.

* * * * *